US010204167B2

(12) United States Patent
de Sa et al.

(10) Patent No.: US 10,204,167 B2
(45) Date of Patent: Feb. 12, 2019

(54) TWO-DIMENSION INDEXED CAROUSELS FOR IN SITU MEDIA BROWSING ON MOBILE DEVICES

(75) Inventors: Marco de Sa, San Francisco, CA (US); David Ayman Shamma, San Francisco, CA (US); Elizabeth F. Churchill, San Francisco, CA (US); Judd Antin, Berkeley, CA (US)

(73) Assignee: Oath Inc., New York, NY (US)

( * ) Notice: Subject to any disclaimer, the term of this patent is extended or adjusted under 35 U.S.C. 154(b) by 232 days.

(21) Appl. No.: 13/420,437

(22) Filed: Mar. 14, 2012

(65) Prior Publication Data

US 2013/0246448 A1    Sep. 19, 2013

(51) Int. Cl.
*G06F 17/30*    (2006.01)

(52) U.S. Cl.
CPC ............................. *G06F 17/30873* (2013.01)

(58) Field of Classification Search
USPC .......................................................... 707/758
See application file for complete search history.

(56) References Cited

U.S. PATENT DOCUMENTS

| | | | | |
|---|---|---|---|---|
| 7,627,883 | B2 * | 12/2009 | Fries | 725/50 |
| 7,712,113 | B2 * | 5/2010 | Yoon et al. | 725/9 |
| 7,757,171 | B1 * | 7/2010 | Wong et al. | 715/719 |
| 7,970,240 | B1 * | 6/2011 | Chao | G06F 17/30274 382/305 |
| 2004/0169736 | A1 * | 9/2004 | Rakvica | H04N 1/00326 348/222.1 |
| 2006/0170956 | A1 * | 8/2006 | Jung | H04N 1/00137 358/1.15 |
| 2006/0171695 | A1 * | 8/2006 | Jung | G06T 3/4023 396/56 |
| 2006/0212455 | A1 * | 9/2006 | Perry et al. | 707/100 |
| 2007/0236505 | A1 * | 10/2007 | Jung | G06T 3/4023 345/589 |
| 2009/0070363 | A1 * | 3/2009 | Bull et al. | 707/102 |
| 2010/0191459 | A1 * | 7/2010 | Carter et al. | 701/208 |
| 2010/0331016 | A1 * | 12/2010 | Dutton | H04W 4/02 455/456.3 |

(Continued)

OTHER PUBLICATIONS

Rao, L., "Google Taps Cooliris to Enable Media Browsing on Nexus One," TC, Jan. 5, 2010.
Nokia, "Mobile Design Pattern: Carousel," May 6, 2009.

*Primary Examiner* — Syling Yen
*Assistant Examiner* — Bao G Tran
(74) *Attorney, Agent, or Firm* — Weaver Austin Villeneuve & Sampson LLP

(57) ABSTRACT

In one embodiment, a set of one or more metadata values may be obtained via a device, where the set of one or more metadata values indicate conditions present with respect to the device, the user of the device, and/or one or more friends of the user. Multiple media items in a plurality of media items may be identified by identifying at least a portion of the plurality of media items based, at least in part, on at least a portion of a second set of one or more metadata values of at least a portion of the plurality of media items and at least a portion of the set of one or more metadata values, where the second set of metadata values indicates conditions present when the corresponding media item was obtained, generated, or identified. A virtual carousel including the multiple media items may be provided.

35 Claims, 13 Drawing Sheets

(56) References Cited

U.S. PATENT DOCUMENTS

2011/0099209 A1* 4/2011 Noh .............................. 707/803
2013/0226926 A1* 8/2013 Beaurepaire ....... G06K 9/00704
　　　　　　　　　　　　　　　　　　　　707/740

* cited by examiner

TWO-DIMENSION INDEXED CAROUSELS FOR IN SITU MEDIA BROWSING ON MOBILE DEVICES

BACKGROUND OF THE INVENTION

The disclosed embodiments relate generally to methods and apparatus for supporting browsing of media on devices based, at least in part, upon metadata associated with the media and metadata pertaining to a browsing context.

A number of technologies exist to facilitate browsing, searching, and identification of media on various platforms. Methods such as alphabetic sorting have traditionally been applied to identify names or titles of media items such as text files. In addition, time-based indexing has been applied to sort media such as text files or photographs based upon the date of capture, generation or modification of the media.

Unfortunately, time-based and alphabetic indexing approaches are often cumbersome, particularly on small devices such as mobile devices.

SUMMARY OF THE INVENTION

The disclosed embodiments enable browsing of media items via a device such as mobile device. Media items may be stored locally or remotely. The media items may be of the same type, or may include multiple types of media.

In accordance with one embodiment, a particular item may be obtained, generated, or identified. A first set of one or more metadata values may be automatically obtained, where the first set of one or more metadata values indicate conditions present when the particular media item is obtained, generated, or identified. The first set of one or more metadata values may be stored such that the first set of one or more metadata values are associated with the particular media item in a set of media items. A second set of one or more metadata values may be obtained via a device in response to a user action with respect to the device, where the second set of one or more metadata values indicates conditions present when the user action is detected. A query may be generated automatically based, at least in part, upon at least a portion of the second set of one or more metadata values. One or more of the set of media items may be provided via the device according to the query.

In accordance with another embodiment, a user action with respect to a device may be detected. A set of one or more metadata values may be obtained via the device, where the set of one or more metadata values indicate conditions present when the user action is detected. A query may be automatically generated based, at least in part, upon at least a portion of the set of one or more metadata values. One or more media items in a set of media items may be identified according to the query. The one or more media items that have been identified may be provided.

In accordance with yet another embodiment, a first set of one or more metadata values may be obtained via a device, where the first set of one or more metadata values indicate conditions present with respect to the device, the user of the device, and/or one or more friends of the user. Multiple media items in a plurality of media items may be identified, where each of the plurality of media items has associated therewith a second set of one or more metadata values indicating conditions present when the one of the plurality of media items was obtained, generated, or identified. The multiple media items may be identified by identifying at least a portion of the plurality of media items based, at least in part, on at least a portion of the second set of one or more metadata values of at least a portion of the plurality of media items and at least a portion of the first set of one or more metadata values. A virtual carousel including the multiple media items may be provided, where a position of each of the multiple media items in the virtual carousel indicates a relationship between the at least a portion of the second set of one or more metadata values of the one of the multiple media items and the at least a portion of the first set of one or more metadata values.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1A:
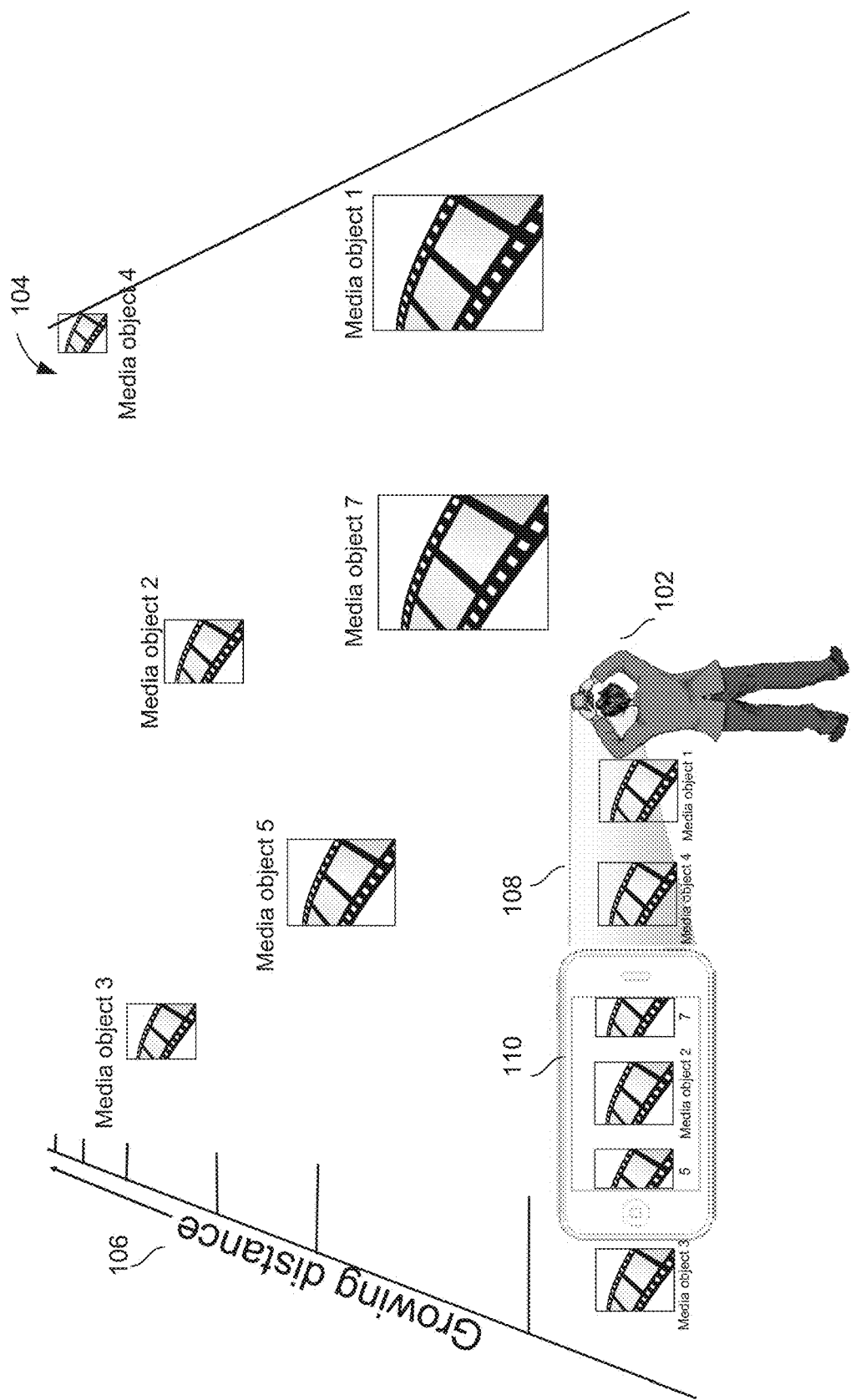
FIG. 1A is a diagram illustrating an example system in which a device such as a mobile device may be used to capture and associate metadata with media items, as well as browse media items using metadata via a graphical user interface such as a virtual carousel in accordance with various embodiments.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The rapid evolution of mobile devices has permitted their utilization for a wide assortment of experiences. In particular, their growing multimedia capturing capabilities have made them widely used tools to capture, store and browse through different types of media while people are on the go. In addition, recent advances in location technology (e.g., GPS, compass), included in most smart-phones that are currently on the market, further extend the possibilities of capturing data that can be automatically tagged and categorized based on the location, orientation or position in which it was captured.

For users, however, there are a number of issues to be faced. One is the amount of data that can be captured and stored on their devices and on servers that can be accessed from their devices. The sheer amount of data plus the nature of the rich data can make storing, indexing, accessing and browsing an issue. This is especially the case considering the small size and interaction modalities that mobile devices afford.

The disclosed embodiments may be applied to facilitate the browsing, searching, and identification of digital media items from devices such as mobile devices. As will be described in further detail below, the disclosed embodiments offer user-centered and intuitive approaches to browsing, searching, and identification of media. Examples of media items include text (e.g., articles or books), Uniform Resource Locators (URLs), audio (e.g., songs or albums), video (e.g., movies), and images (e.g., pictures or photographs).

FIG. 1A is a diagram illustrating an example system in which a device such as a mobile device may be used to capture and associate metadata with media items, as well as browse media items using metadata via a graphical user interface in accordance with various embodiments. In accordance with various embodiments, a user may capture, generate, and/or identify a media item and associate first metadata such as a location and/or orientation with the media item. For example, when a user 102 takes a photograph via the device, the location and/or orientation of the device may be detected and associated with the photograph.

In this example, photographs of various media items 104 at different locations may be captured by the user. As shown in this example, the various media items 104 may be at various distances 106 from the user 102. In accordance with various embodiments, when the user 102 wishes browse among the media items 104, second metadata pertaining to a context surrounding the user at the time of browsing may be obtained.

The media items 104 may be sorted according to the first metadata (or portion thereof) with respect to the second metadata (or portion thereof). The system may present the first metadata implicitly through the positions of the media items within the graphical user interface. More particularly, the system may present the first metadata (or portion thereof) with respect to the second metadata (or portion thereof) implicitly through the media positions within a graphical user interface 108 such as a virtual carousel user interface presented via device 110.

Although the graphical user interface may display a single media item at any given time, in some implementations, the user may access or view multiple media items at a single time. For example, within the user interface 108, the media items 104 may be presented along a single axis, as shown in this example. Alternatively, the media items 104 may be presented in various configurations such as in a semi-circular or circular pattern. Moreover, while the media items 104 may be presented via the user interface 108 such that they are non-overlapping, the media items 104 may also be presented such that they are partially overlapping.

The user 102 may browse the media items 104 via the graphical user interface 108 by performing a user action. In accordance with various embodiments, the user action may include a movement or gesture of the user and/or a movement of the device. Example user actions will be described in further detail below with reference to FIGS. 3A-3B and FIGS. 4A-4B. Thus, the user may easily and efficiently browse the media items 104 without submitting a textual query.

As shown in FIG. 1A, the user interface 108 may include multiple media items, where a position of each of the multiple media items in the user interface 108 indicates a relationship between at least a portion of the first metadata and at least a portion of the second metadata. In this example, the location and orientation of the device 110 when various photographs 104 were taken with respect to the location and orientation of the device 110 during browsing is implicit in the location of the photographs in the user interface 108. More particularly, as shown in this example, the one of the media items 104 to the far left of the user 102, Media object 3, is presented at the leftmost position of the user interface 108, while the one of the media items 104 to the far right of the user 102, Media object 1, is presented at the rightmost position of the user interface 108. As the user 102 performs one or more user actions with respect to the device 110, the user may navigate among the media items presented in the user interface 108. Navigation with respect to user actions with be described in further detail below with reference to FIGS. 3A-3B and FIGS. 4A-4B.

Figure 1B:
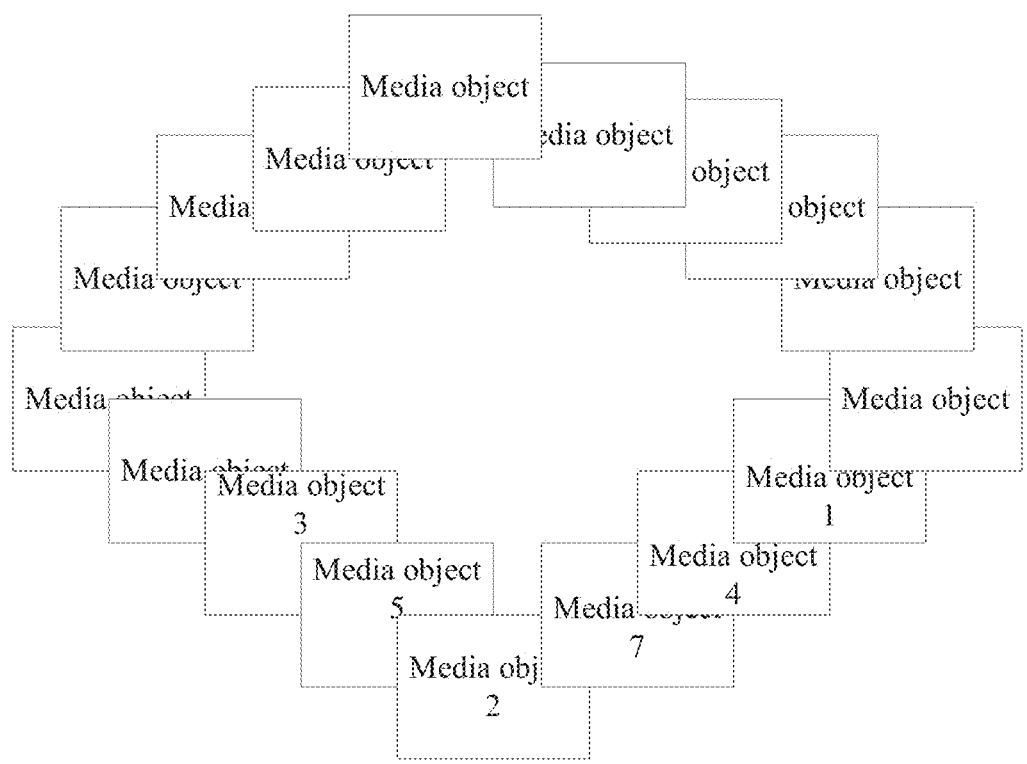
FIG. 1B is a diagram illustrating an example virtual carousel in which media items may be presented in accordance with various embodiments.

FIG. 1B is a diagram illustrating an example virtual carousel that may be implemented as a graphical user interface in accordance with various embodiments. As shown in this example, the virtual carousel may include multiple media items positioned in a configuration such as a semicircular or circular configuration. In response to a user action, the user may navigate among media items in the virtual carousel in a clockwise or counter-clockwise direction. However, this example is merely illustrative, and other types of graphical user interfaces may be implemented, as well.

FIGS. 2A-D are process flow diagrams illustrating various embodiments supporting browsing of media via a device such as a mobile device. A general process of implementing the disclosed embodiments will be described with reference to FIG. 2A. As will be described in further detail below with reference to FIG. 2A, contextual information may be associated with a media item. Browsing of media items may then be performed based, at least in part, upon the contextual information.

Association of Contextual Information with Media Item

Figure 2A:
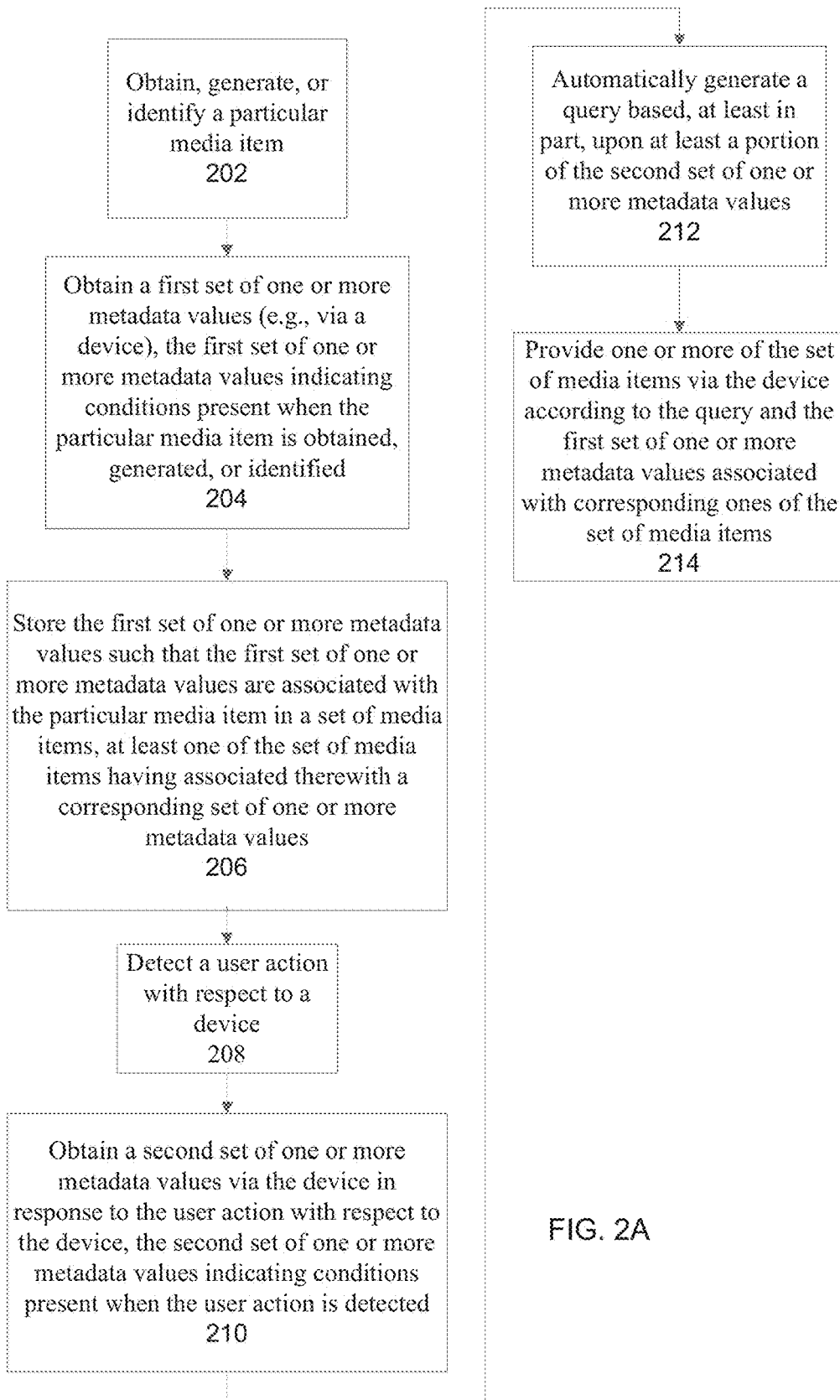
FIGS. 2A-D are process flow diagrams illustrating example methods of supporting browsing of media via a device such as a mobile device in accordance with various embodiments.

As shown in FIG. 2A, a media item may be obtained, generated, or identified at 202. More particularly, the media item may be obtained, generated, or identified via a device such as a mobile device automatically or in response to user input. For example, a user may capture a media item such as a photograph when the user takes the photograph with a camera of a device such as a mobile device. Thus, the media item may be captured (e.g., generated) by the user. Alternatively, the user may obtain or otherwise identify a media item after the media item has been generated or captured (e.g., by the user or another individual). For example, the user may select a photograph via the device from a plurality of photographs.

In addition, a first set of one or more metadata values may be obtained via the device at 204, where the first set of metadata values pertains to a context surrounding the media item. More particularly, the first set of one or more metadata values may indicate conditions present when the particular media item is obtained, generated, or identified. For example, the first set of metadata values may include a location of the device when the media item is obtained, generated, or identified. Therefore, the first set of metadata values may include a value for each of one or more metadata items.

Example metadata items include location (e.g., geographical location of the device and/or user), position (e.g., coordinates of the device), proximity, orientation (e.g., of the device), movement in a particular direction, lighting (e.g., lumens), date, time, temperature, altitude, speed, acceleration, and noise level (e.g., decibels), sound (e.g., sound byte(s) or identification of a particular sound), mood (e.g., heartbeat), smell, friends at the location or within a particular vicinity, friends who were previously at this location or within a particular vicinity, personal meaning for the user, and/or user-generated content (e.g., voice, tags, moods). Metadata items may also indicate a relationship between various metadata items. Thus, the metadata value(s) may each pertain to the device, a user of the device, and/or friend(s) of the user.

Orientation of the device may be expressed via a variety of parameters including an angle and/or direction of rotation of the device. Moreover, orientation may include movement around an axis of the device that changes the direction that the device is facing. In addition, orientation may include movement along a single axis (e.g., to the left or right).

The location may be a geographical area, a location identified by specific Global Positioning System (GPS) coordinates, an establishment or business entity (e.g., airport or restaurant), an address, a building, etc. A geographical area may be defined by a street block, neighborhood (e.g., Times Square), city, state, an area defined by coordinates delineating the boundaries of the area, an area defined by boundaries selected on a map provided via a graphical user interface, etc.

The location of the device and/or user may be identified based upon traditional mechanisms such as IP address, wifi triangulation, cell tower triangulation, and/or GPS location. Other mechanisms for tracking a user's location include applications such as Glympse, which enables a user to share his or her location. In addition, the user's location may be ascertained based upon check-in information. More particularly, a user may choose to check in to a particular location via an application such as Foursquare, Messenger, or Bubbles. Such a check-in application may be accessed via a web site and/or installed on a device such as a mobile device.

Each of the metadata items may be defined objectively and/or subjectively. For example, the location may be objectively defined (e.g., Clift Hotel) and/or subjectively defined (e.g., the place where we got married). As another example, the date or time may be objectively defined (e.g., May 8, 2012) and/or subjectively defined (e.g., the day we got married, during our wedding). Thus, a particular event may be used to define a value of one or more metadata items such as a particular date, time, or location. Thus, metadata items may indicate the user relevance of where and/or when a particular media item was captured.

Human memory often works by remembering the context in which an event took place. People often remember events by time (e.g., it was last week, it was on your birthday), but also by location (e.g., we were in Santa Clara at Yahoo!, we were in London just after Paris but before New York, we went to the mall and then we took those videos). This ability of people to remember and search/browse on the basis of objective metadata such as time, location(s), position or proximity, as well as more subjective metadata such as mood, where or when an event took place, or location paths (location before an event, location where an event was situated or location after an event) has not been fully exploited in interfaces or browsing mechanisms.

The device may include hardware and/or software to enable various metadata items such as those listed above to be captured (e.g., detected). An example device will be described in further detail below with reference to FIG. 6. The use of the array of sensors currently available on devices such as mobile devices (e.g., GPS, compass, accelerometer, microphones for audio notes, etc.) support the automatic capture of metadata that may offer users more meaningful browsing alternatives.

At least one of the metadata item(s) for which value(s) are to be obtained (e.g., received or detected) may be configured by the user of the device and/or another user (e.g., a parent of the user). Alternatively, the device may be statically configured (e.g., upon sale of the device) with the metadata item(s) for which value(s) are to be obtained. Moreover, the device may automatically configure the metadata item(s) for which value(s) are to be captured (e.g., those that are supported by the device and/or those that are relevant to a particular media type). The metadata item(s) may include those that are supported by the device and/or those that are important to the user (or other individual). Moreover, the configuration of the metadata item(s) may be performed to maintain privacy of the user (e.g., with respect to location or other information). The configuration of the metadata item(s) for which value(s) are to be obtained may be selected from a plurality of metadata values such as those described above. Once a selection of a set of one or more metadata items from a plurality of metadata items has been received, the device may obtain (e.g., detect) a value for each of the set of one or more metadata items.

At least one of the value(s) of the metadata item(s) may be obtained based, at least in part, upon input received from the user. In this manner, value(s) of one or more metadata items may be user-specified. For example, the user may specify the user's mood. Alternatively, the device may automatically capture at least one of the value(s) of the metadata item(s). For example, the device may automatically detect the location of the device.

When the value(s) of the metadata item(s) are obtained, the user may be at a location of the device. However, the user need not be operating the device when the value(s) of the metadata item(s) are obtained.

Once a media item has been obtained, generated, or otherwise identified via the device, the media item may be associated with the first set of metadata values. More particularly, the first set of one or more metadata values may be stored at 206 such that the first set of one or more metadata values are associated with the media item. The media item may be one of a set of media items, where at least one of the set of media items has associated therewith a corresponding set of one or more metadata values. The set of media items may include media items associated with the user (e.g., obtained, generated, or identified by the user). In addition, the set of media items may include media items associated with one or more other individuals (e.g., obtained, generated or identified by the other individuals). For example, these other individuals may include contacts of the user.

In accordance with various embodiments, the media item and corresponding metadata value(s) of the metadata item(s) may be stored locally to a memory of the device. In addition, the media item and corresponding metadata value(s) of the metadata item(s) may be stored remotely to a storage device coupled to a server. For example, the media item and corresponding metadata value(s) may be uploaded via Flickr to the user's Flickr account. Media items and corresponding metadata values may be uploaded from the device to the storage device or server automatically, or in response to a user instruction. Thus, a plurality of media items may be stored such that one or more of the plurality of media items has associated therewith a different, corresponding set of one or more metadata values.

Storage of media items and corresponding metadata value(s) to a central server (or corresponding storage device) may provide the benefits of storing media items and corresponding metadata values for multiple users. This enables users to browse the media items of other users, in addition to their own media items, in accordance with the disclosed embodiments. In contrast, maintaining the media items and corresponding metadata values in a local memory limits the visibility of this information to the user (or other user(s) accessing the device). In accordance with various embodiments, users may limit the visibility of their media items and corresponding metadata values to contacts of the user.

In accordance with various embodiments, the media items and corresponding metadata values may be stored such that the media items are indexed and sorted according to the values of one or more metadata items. For example, the media items may be stored according to location. Storing of media items in this manner may be accomplished through the use of a relational database or other suitable data structure. By storing the media items in this manner, search and retrieval of metadata items in response to a query as described herein may be accomplished in an efficient manner.

Browsing

Browsing may be initiated in response to a user action via a device such as a mobile device. In accordance with various embodiments, the user action does not include textual input. More particularly, the user action may include a gesture made by the user with respect to the device, or a movement of the device with respect to one or more axes. Example user actions will be described in further detail below with reference to FIGS. 3A-3B and FIGS. 4A-4B.

Where the media item(s) and corresponding first set of metadata values are stored locally, browsing may be performed via the same device as that via which the first set of metadata values has been obtained. However, where the media item(s) and corresponding first set of metadata values are stored remotely, browsing need not be performed via the same device as that via which the first set of metadata values has been obtained. Thus, a user action with respect to a device such as a mobile device may be detected at 208 via the same device as that via which steps 202-206 are performed. Alternatively, a user action with respect to a device may be detected at 208 via a different device from that via which steps 202-206 are performed. Remaining browsing operations may be performed via the device, as discussed below.

A second set of one or more metadata values may be obtained via the device at 210 in response to the user action with respect to the device, where the second set of one or more metadata values indicate conditions present when the user action is detected. More particularly, upon detecting the user action, the second set of metadata values may be detected, obtained, and/or stored. Example user actions will be described in further detail below with reference to FIGS. 3A-3B and 4A-4B. Each of the second set of one or more metadata values may include a value of a metadata item such as those described above.

In accordance with various embodiments, the first set of metadata values and the second set of metadata values may include values for the same metadata items. For example, the first set of metadata values may include a location, date, and mood of the user at the time of capture of a photograph, while the second set of metadata values may include a location, date and mood of the user when the user action is detected (e.g., during browsing). As another example, the first the set of metadata values may include a location and orientation of the device when a particular media item is obtained, generated, or identified, while the second set of metadata values may include a location and orientation of the device when the user action is detected.

At least one of the second set of metadata values may be obtained based, at least in part, upon input received from the user. For example, the user may specify the user's mood at the time of browsing. Alternatively, the device may automatically capture at least one of the second set of metadata values. For example, the device may automatically detect the location of the device at the time of browsing.

A query may be automatically generated based, at least in part, upon at least a portion of the second set of one or more metadata values at 212. For example, where the second set of metadata values indicates that the current location is San Francisco, the device may generate a query that searches for media items having a location metadata item value of San Francisco. Thus, the device may generate the query. The device may choose to execute the query or transmit the query to a remote server for execution by the server. Alternatively, the device may transmit at least a portion of the second set of metadata values to a remote server, which may generate the query. The query may include all of the second set of metadata values or only a portion of the second set of metadata values.

One or more of the set of media items may be provided (e.g., presented, displayed, or made accessible) via the device according to the query at 214. More particularly, each of the set of media items may have associated therewith a first set of one or more metadata values indicating conditions present when the one of the set of media items was obtained, generated, or identified. One or more media items in the set of media items may be identified based, at least in part, on at least a portion of the second set of one or more metadata values and at least a portion of the first set of one or more metadata values.

The device may execute the query to search the set of media items for those media items for which at least a portion of the first set of metadata values are the same as, essentially the same as, and/or compatible with at least a portion of the second set of metadata values. For example, the location of Times Square may be considered to be included in the location New York. Alternatively, a remote server may execute the query against media items stored at one or more storage devices coupled to the server. The remote server may then transmit the media items or identification thereof to the device.

In accordance with various embodiments, the one or more media items may be ordered in accordance with a user-specified sorting order. For example, this sorting order may be specified by the user during configuration of the device. The sorting order may indicate the metadata item(s) to be used for sorting the metadata items and/or the priority among the metadata item(s) for sorting purposes.

The one or more media items may be provided such that the metadata value(s) of the first set that match, are essentially the same as, or are compatible with the metadata value(s) of the second set are displayed. Alternatively, the one or more media items may be provided without any additional information. A pre-defined number of media items may be provided via a display of the device. In accordance with various embodiments, multiple media items may be displayed via a virtual carousel.

User selections may be associated with a particular media type. For example, user selections pertaining to metadata items to be captured (e.g., automatically) and associated with media items and/or metadata items to be captured (e.g., automatically) and applied for browsing purposes may be received for each media type. Thus, the browsing process may be personalized based, at least in part, upon the type of media being browsed.

Figure 2B:
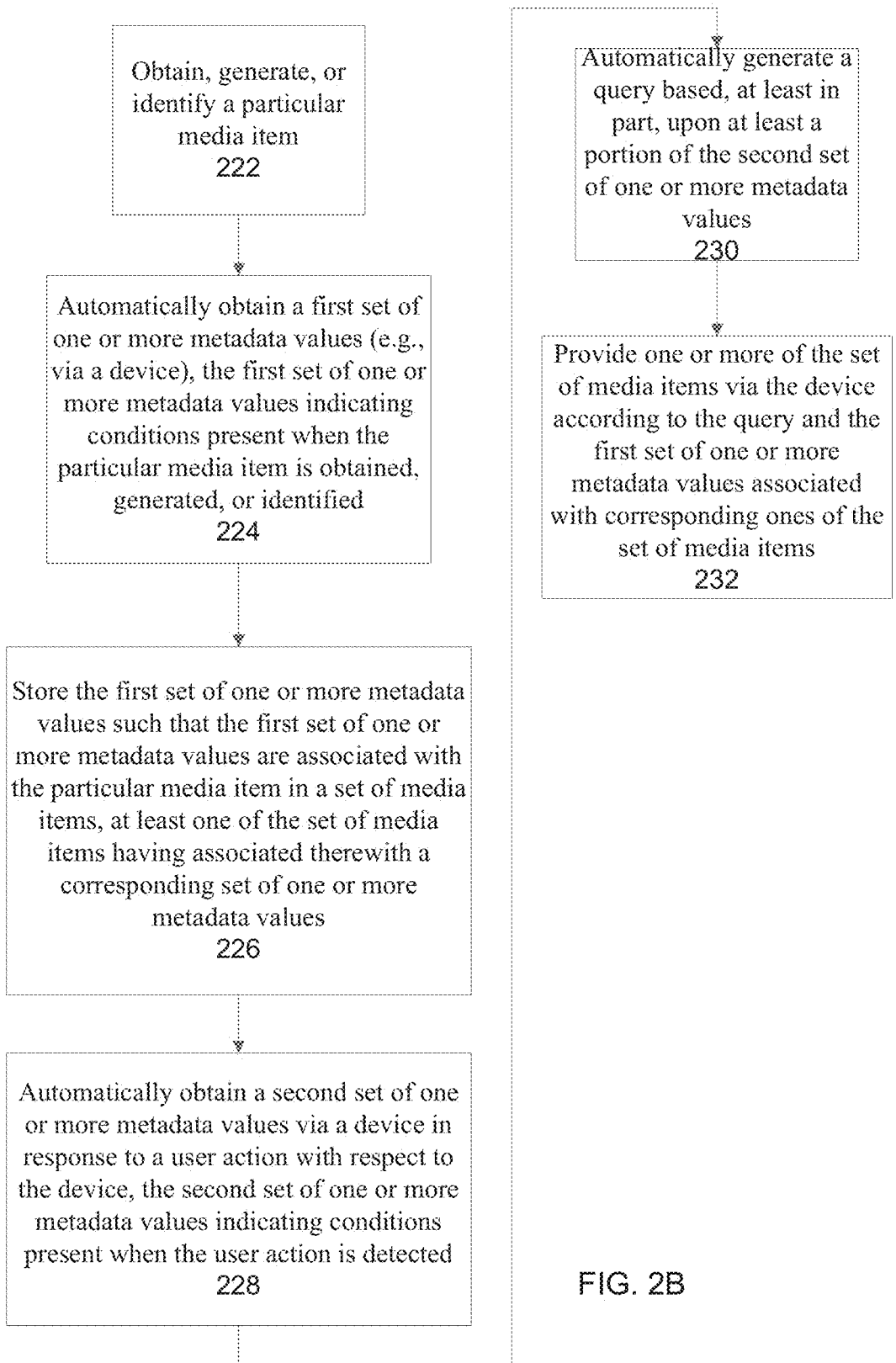

FIG. 2B is a process flow diagram illustrating a method of browsing media items according to various embodiments. More particularly, a first set of metadata values may be obtained automatically. In addition, the browsing may be performed based, at least in part, upon at least a portion of a second set of metadata values that have been automatically obtained.

As shown at 222, a particular media item may be obtained, generated, or identified. A first set of one or more metadata values may be automatically obtained at 224, where the first set of one or more metadata values indicate conditions present when the particular media item is obtained, generated, or identified. The first set of one or more metadata values may be stored at 226 such that the first set of one or more metadata values are associated with the particular media item in a set of media items, where at least one of the set of media items has associated therewith a corresponding set of one or more metadata values. A second set of one or more metadata values may be automatically obtained via a device at 228 in response to a user action with respect to the device, where the second set of one or more metadata values indicate conditions present when the user action is detected. A query may be automatically generated at 230 based, at least in part, upon at least a portion of the second set of one or more metadata values. One or more of the set of media items may be provided via the device at 232 according to the query. Accordingly, media items may be indexed, sorted, and/or presented based, at least in part, upon metadata automatically captured by the system (e.g., at the time of media capture and/or at the time of media browsing).

Figure 2C:
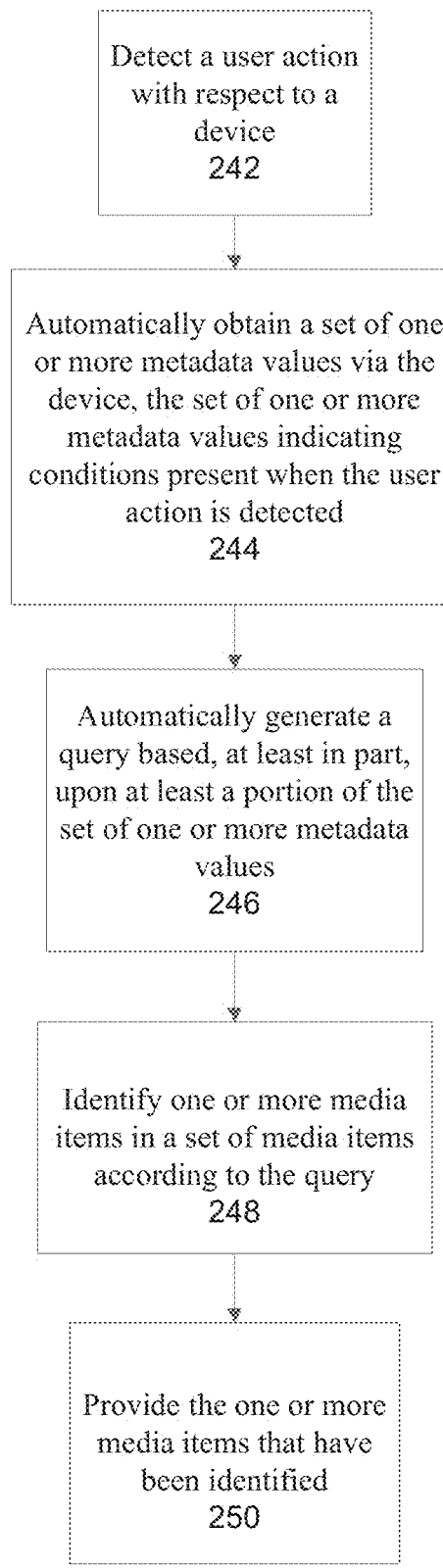

FIG. 2C is a process flow diagram illustrating an example method of browsing media items according to automatically captured metadata in accordance with various embodiments. More particularly, a set of metadata values may be obtained automatically in response to a user action. Browsing may be performed based, at least in part, upon at least a portion of the set of metadata values.

A device such as a mobile device may detect a user action with respect to the device at 242. The device may automatically obtain a set of one or more metadata values at 244, where the set of one or more metadata values indicate conditions present when the user action is detected. A query may be automatically generated at 246 based, at least in part, upon at least a portion of the set of one or more metadata values. One or more media items in a set of media items may be identified according to the query at 248. The one or more media items that have been identified may be provided at 250.

Figure 2D:
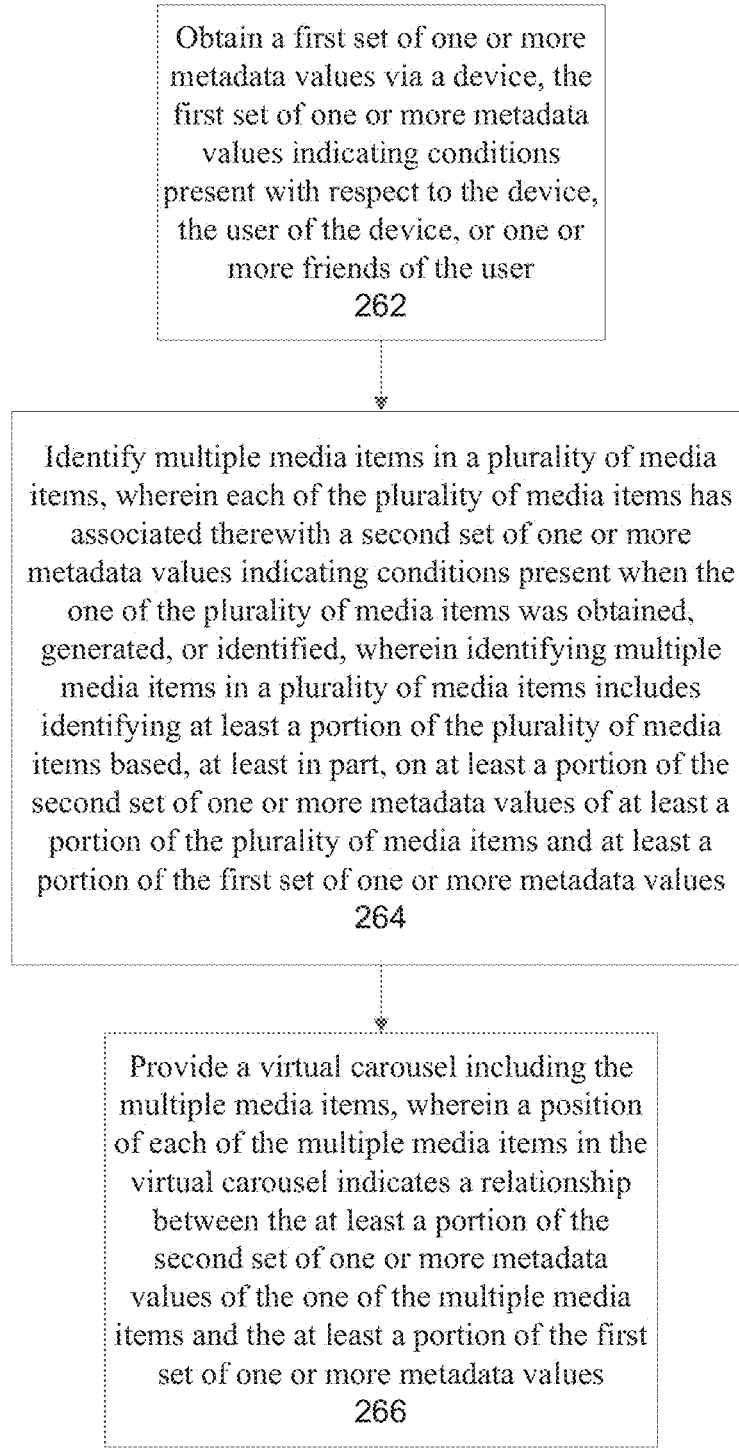

FIG. 2D is a process flow diagram illustrating an example method of supporting browsing of media items via a virtual carousel graphical user interface in accordance with various embodiments. A first set of one or more metadata values may be obtained at 262 via a device, where the first set of one or more metadata values indicate a context surrounding browsing. More particularly, the first set of metadata values may indicate conditions present with respect to the device, the user of the device, and/or one or more friends of the device.

The first set of metadata values may include values for one or more metadata items such as those set forth above. In accordance with various embodiments, the first set of metadata values may represent the conditions present when a user action is detected. In other words, detection of a user action may initiate the presentation of a virtual carousel graphical user interface as disclosed herein. For example, the user action may include a user action such as that described below with reference to FIGS. 3A-3B and FIGS. 4A-4B.

Multiple media items in a plurality of media items may be identified at 264. For example, a query may be generated and executed via the device and/or a remote server, as described above. In accordance with various embodiments, each of the plurality of media items has associated therewith a second set of one or more metadata values indicating conditions present when the one of the plurality of media items was obtained, generated, or identified. The multiple media items may be identified based, at least in part, on at least a portion of the second set of one or more metadata values of at least a portion of the plurality of media items and at least a portion of the first set of one or more metadata values indicating a present context (e.g., when browsing is initiated or being performed).

A virtual carousel including the multiple media items may be provided at 266. More particularly, the virtual carousel may be presented via a display of the device, wherein a position of each of the multiple media items in the carousel indicates a relationship between the at least a portion of the second set of one or more metadata values of the one of the multiple media items and the at least a portion of the first set of one or more metadata values indicating the present context. A virtual carousel may present media in a manner that enables a user to easily browse media items, while implementing metadata as an intrinsic search and filtering mechanism.

Navigation among the multiple media items in the virtual carousel may be accomplished in response to a user action such as that described below with reference to FIGS. 3A-3B and FIGS. 4A-B. In accordance with various embodiments, navigation may be accomplished without receiving textual input from the user. Rather, the detection of a user action such as a movement of the device or a gesture of the user may incrementally navigate among the media items in the virtual carousel. In accordance with various embodiments, depending upon the user action, navigation among the media items in the virtual carousel may be performed in either a clockwise or counter-clockwise direction.

Figure 3A:
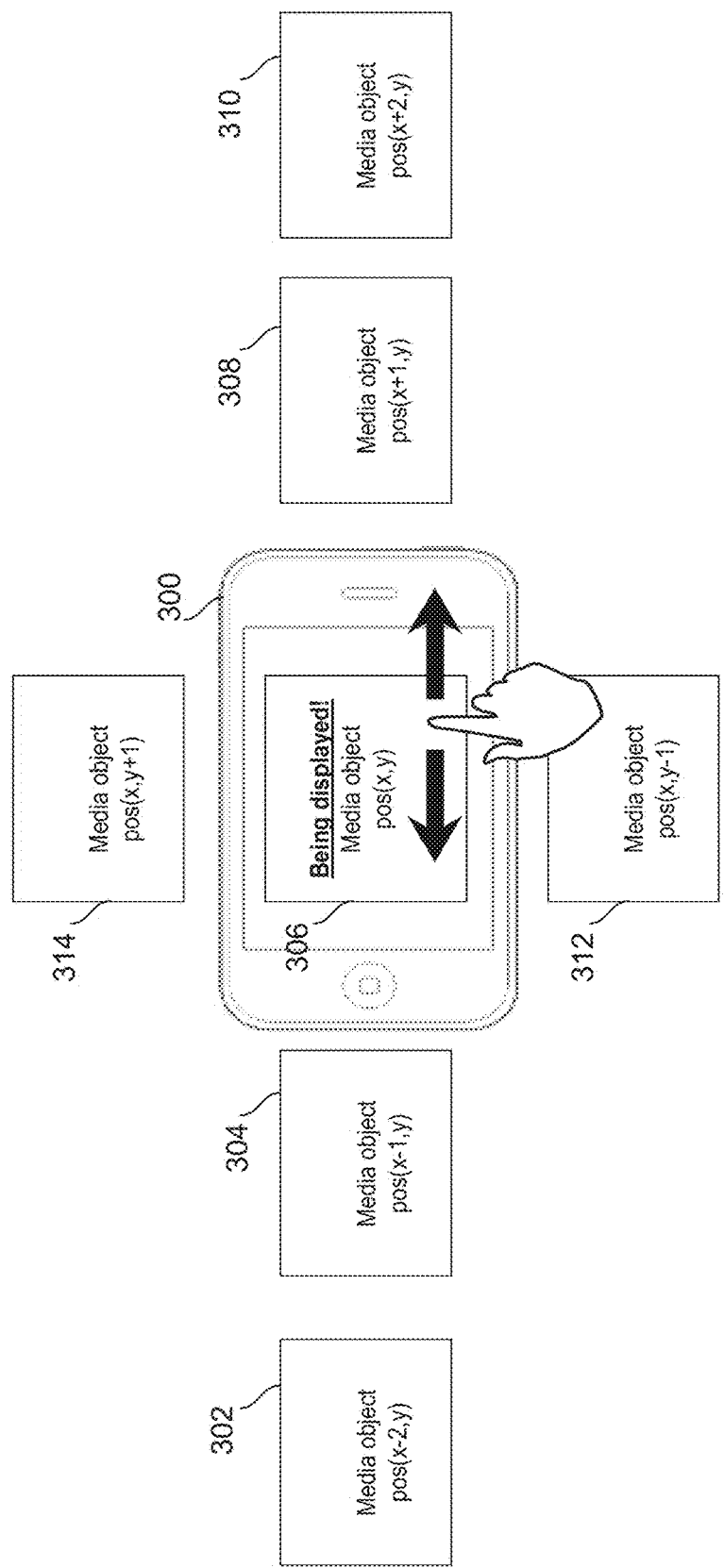
FIGS. 3A-3B are diagrams that together illustrate an example two-dimensional user action with respect to a device such as a mobile device in accordance with various embodiments.
Figure 3B:
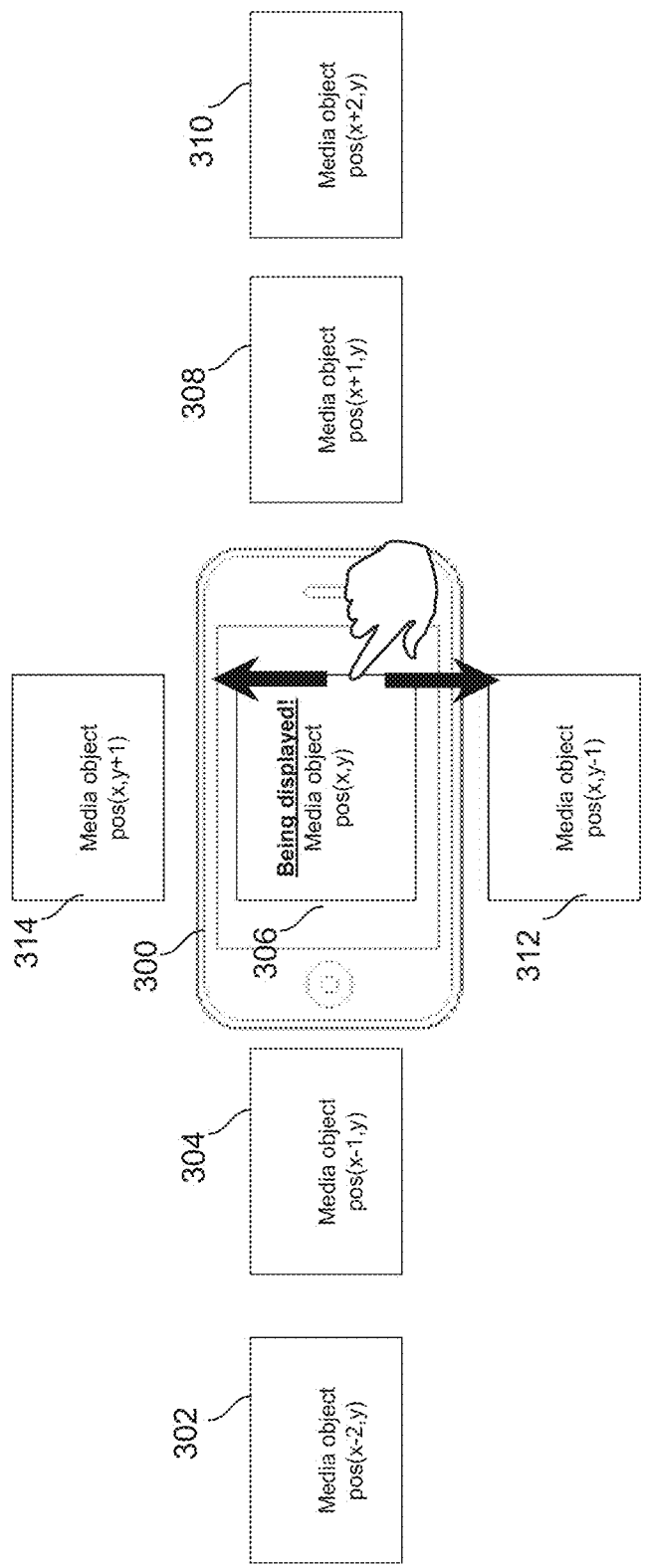

FIGS. 3A-3B are diagrams that together illustrate an example two-dimensional user action with respect to a device such as a mobile device in accordance with various embodiments. As shown in FIG. 3A, a user may perform a gesture such as a swipe gesture with respect to a device 300 to navigate through the media items (i.e., media objects) and interact with a graphical user interface such as a virtual carousel. In this example, different media objects 302, 304, 306, 308, 310, 312, and 314 have been sorted based, at least in part, upon their physical locations (e.g., at time of media capture), indicated by their coordinates along the x-axis and y-axis.

The user may perform a gesture or movement with respect to the device to navigate among the media objects presented within a graphical user interface of the device 300. In this example, the user may perform a touch-based interaction with the device 300 by swiping his or her finger left or right along the x-axis. In this manner, the user may browse among the media items based upon the position of the media objects along the x-axis. Similarly, as shown in FIG. 3B, the user may perform a touch-based interaction with the device 300 by swiping his or her finger up or down along the y-axis. In this manner, the user may browse among the media items based upon the position of the media objects along the y-axis. More particularly, media items may be browsed based upon the position of the media objects in the graphical user interface with respect to the position of the user. Therefore, the position of the user may function as a cue to the user as to the location of media items within the graphical user interface.

Touch-based interactions often involve partially covering the screen. However, it is important to note that the gesture of the user need not be touch-based. In accordance with various embodiments, a user action may include a gesture that is not a touch-based interaction. Touchless browsing may be advantageously performed in environments in which a user cannot easily reach their device, such as for over-the-head browsing.

Figure 4A:
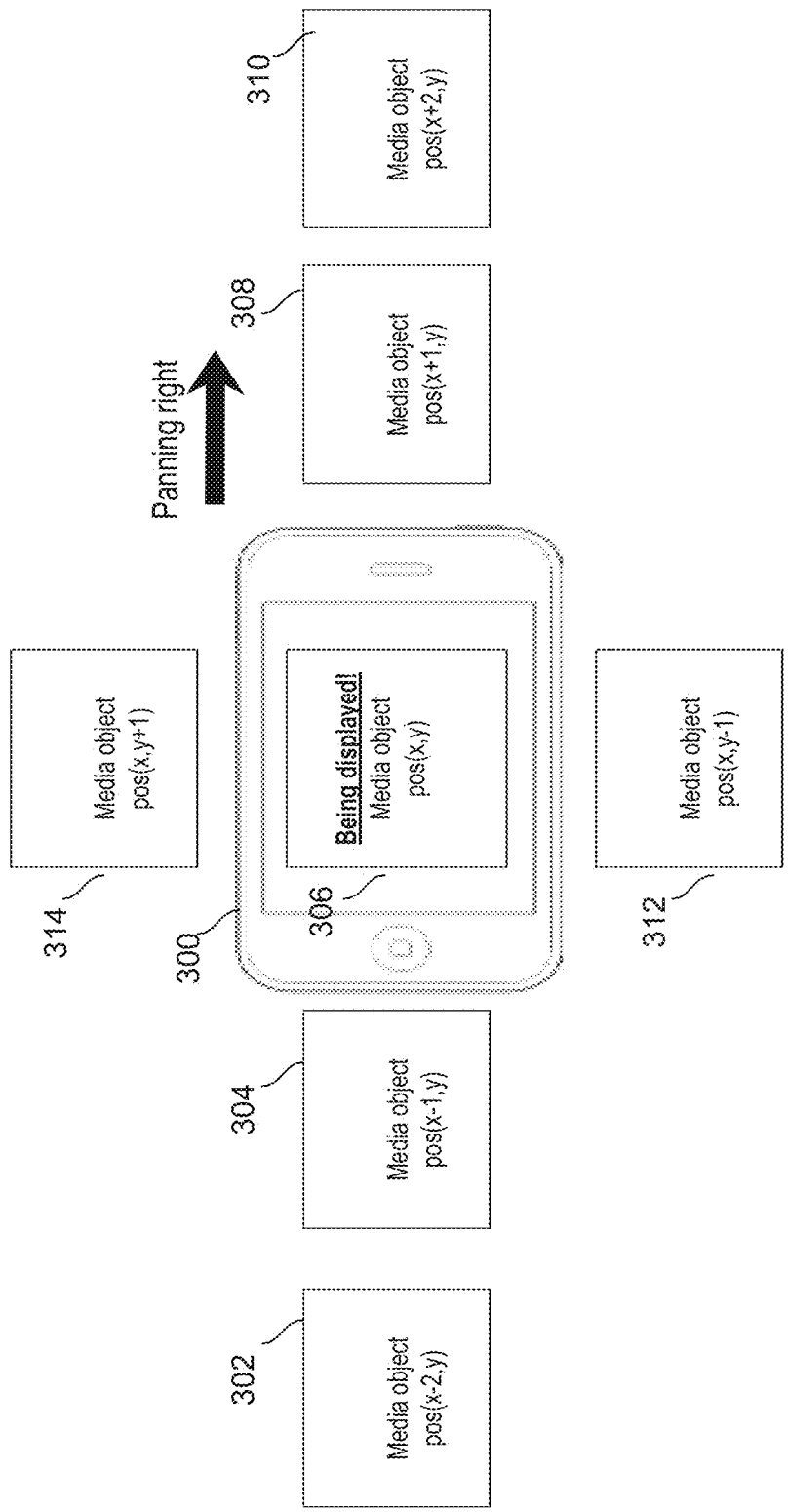
FIGS. 4A-B are diagrams that together illustrate an example three-dimensional user action with respect to a device such as a mobile device in accordance with various embodiments.
Figure 4B:
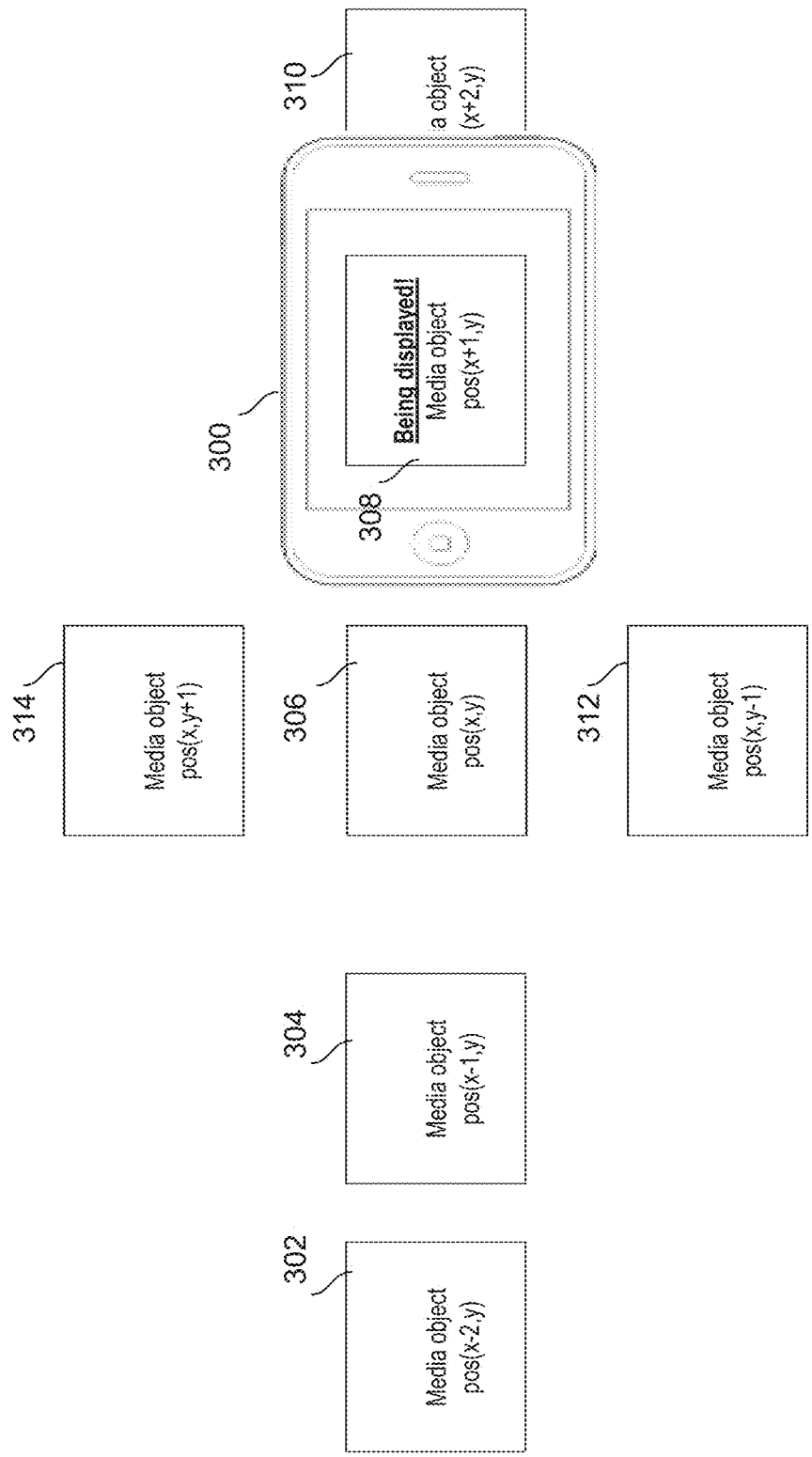

FIGS. 4A-B are diagrams that together illustrate an example three-dimensional user action with respect to a device such as a mobile device in accordance with various embodiments. In this example, the user may perform a movement of the device 300 with respect to one or more axes. This may be accomplished by manually moving the device 300 along one or more axes with respect to the surroundings. For example, the user may perform a panning motion to swing the device 300 in a horizontal or vertical plane. As shown in FIG. 4A, a particular media item may be displayed by the device 300. As shown in FIG. 4B, when the user moves the device 300 along the x-axis by panning the device 300 right, a new media item is displayed by the device 300.

Although not shown in these examples, the movement of the device 300 may be performed such that the device 300 is tilted according to a particular angle with respect to one or more axes. Thus, the user may perform a pitching motion to move the device 300 along one or more axes and/or in accordance with one or more orientations. In this manner, the user may perform a movement of the device to navigate the media items according to metadata such as location, position, and/or orientation metadata.

As described above, browsing of media items may be performed according to user gestures, including touch-based and/or motion-based gestures. As a result, users need not submit textual input to browse media items. The disclosed embodiments provide a non-intrusive browsing mechanism based, at least in part, upon gestures. In accordance with various embodiments, user gestures may be performed within a simulated environment such as movement based augmented reality browsing mechanism. Therefore, navigation of media items may be performed efficiently and without significant effort by a user.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 5:
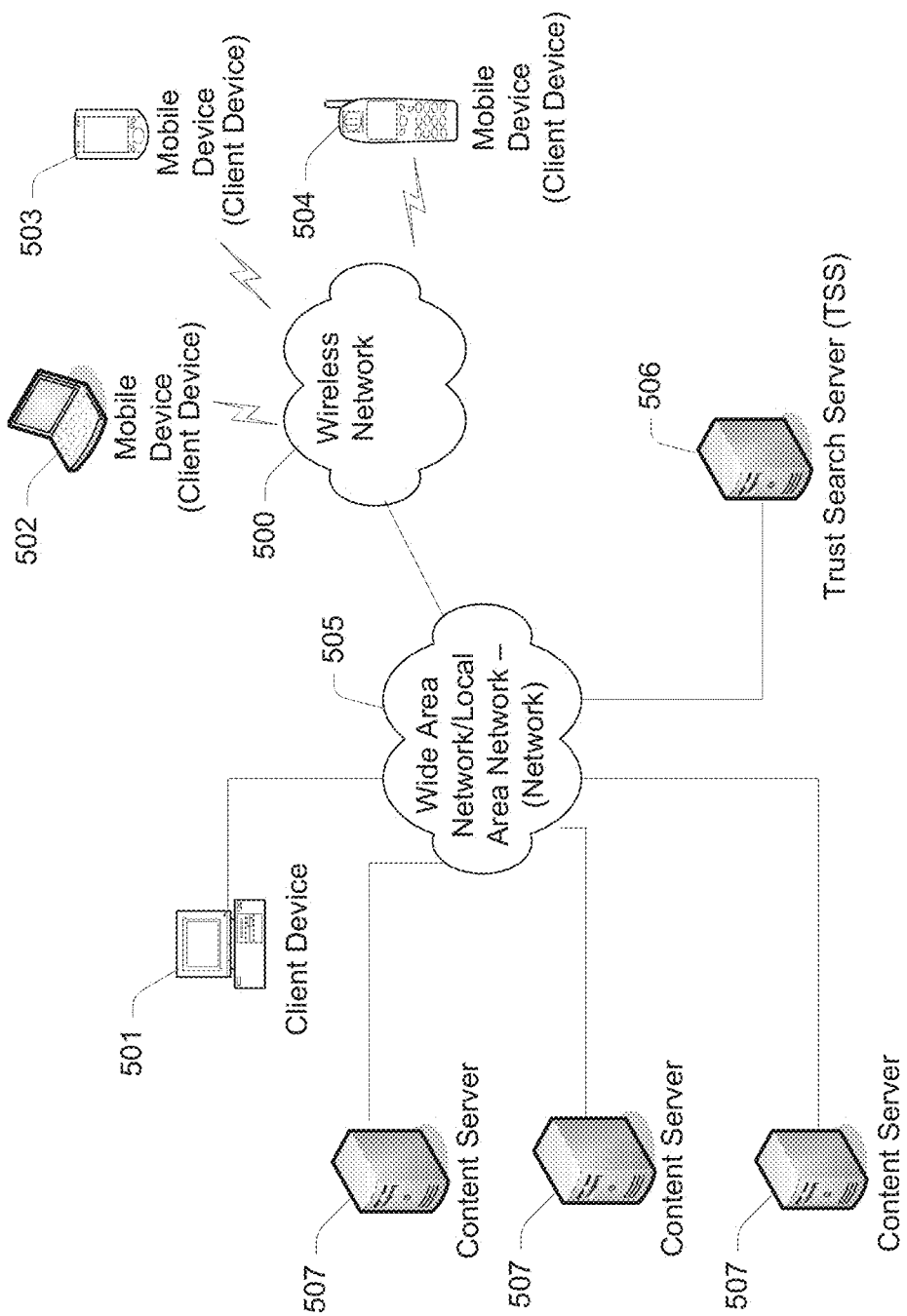
FIG. 5 is a schematic diagram illustrating an example embodiment of a network in which various embodiments may be implemented.

The disclosed embodiments may be implemented in any of a wide variety of computing contexts. FIG. 5 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 5, for example, includes a variety of networks, such as a LAN/WAN 505 and wireless network 500, a variety of devices, such as client devices 501-504, and a variety of servers such as content server(s) 507 and search server 506. The servers may also include an ad server (not shown). The servers may be associated with a web site such as a social networking web site. Examples of social networking web sites include Yahoo, Facebook, Tumblr, LinkedIn, Flickr, and Meme.

As shown in this example, the client devices 501-504 may include one or more mobile devices 502, 503, 504. Client device(s) 501-504 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The association of metadata with media items and browsing of media items may be implemented according to the disclosed embodiments in some centralized manner. This is represented in FIG. 5 by content server(s) 507, which may correspond to multiple distributed devices and data store(s). The content server(s) 507 and/or corresponding data store(s) may store user account data and/or preferences, media and corresponding metadata, etc.

The servers may enable a web site to provide a variety of services to its users. More particularly, users of the web site may maintain public user profiles, interact with other members of the web site, upload media (e.g., photographs, videos), etc. In addition, the web site may be a search engine provider.

The servers may have access to one or more user logs (e.g., user databases) into which user information is retained. This user information or a portion thereof may be referred to as a user profile. More particularly, the user profile may include public information that is available in a public profile and/or private information. The user logs may be retained in one or more memories that are coupled to the servers.

The user information retained in the user logs may include personal information such as demographic information (e.g., age and/or gender) and/or geographic information (e.g., residence address, work address, and/or zip code). In addition, each time a user performs online activities such as clicking on an advertisement or purchasing goods or services, information regarding such activity or activities may be retained as user data in the user logs. For instance, the user data that is retained in the user logs may indicate the identity of web sites visited, identity of ads that have been selected (e.g., clicked on) and/or a timestamp. Moreover, information associated with a search query, such as search term(s) of the search query, information indicating characteristics of search results that have been selected (e.g., clicked on) by the user, and/or associated timestamp may also be retained in the user logs. A user may be identified in the user logs by a user ID (e.g., user account ID), information in a user cookie, etc.

In one embodiment, as an individual interacts with a software application, e.g., an instant messenger or electronic mail application, descriptive content, such in the form of signals or stored physical states within memory, such as, for example, an email address, instant messenger identifier, phone number, postal address, message content, date, time, etc., may be identified. Descriptive content may be stored, typically along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

A profile builder may initiate generation of a profile, such for users of an application, including a search engine, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of search results, such as with respect to a particular user.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

Figure 6:
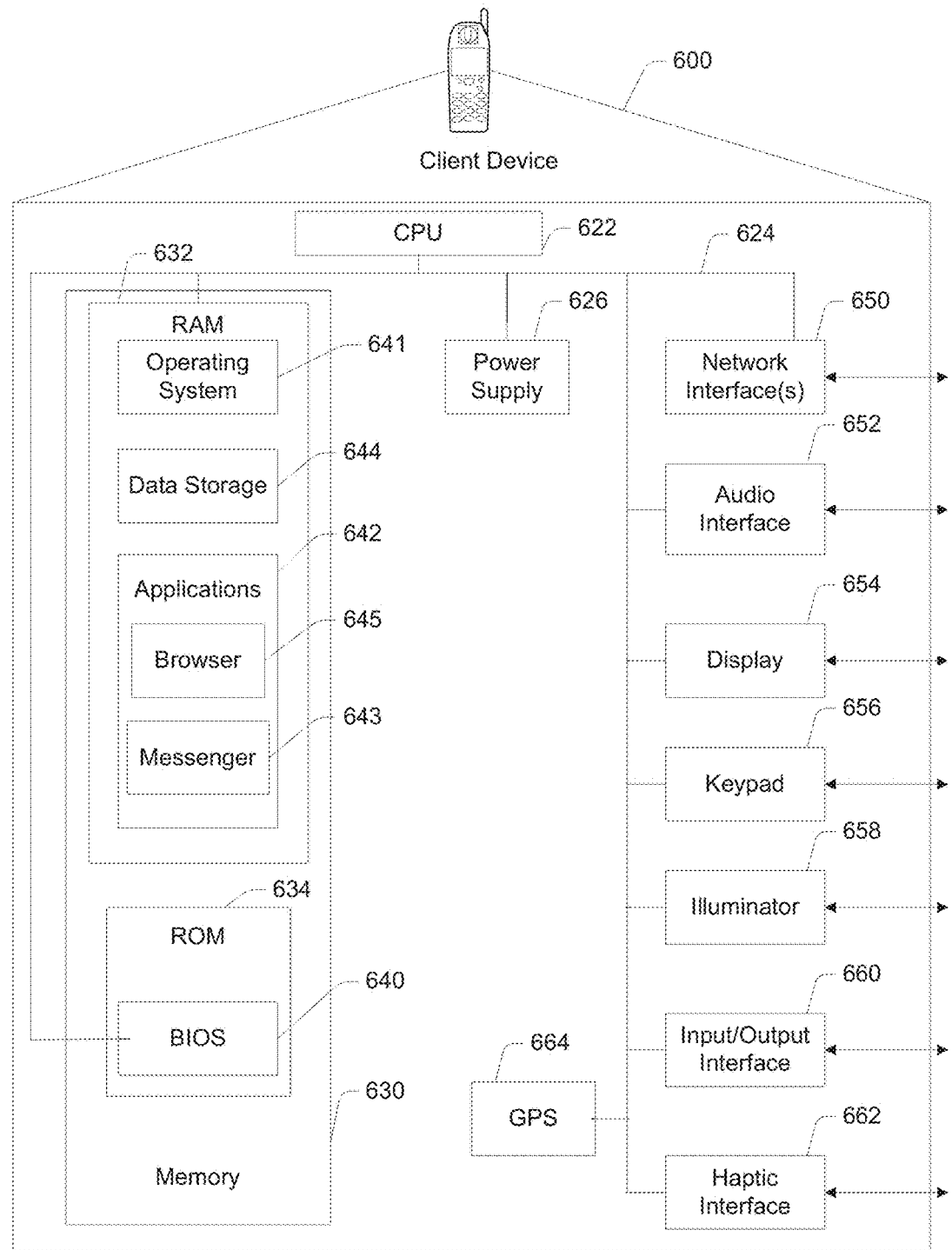
FIG. 6 is a schematic diagram illustrating an example client device in which various embodiments may be implemented.

FIG. 6 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR)

device, a Personal Digital Assistant (PDA), a handheld computer, a tablet computer, a laptop computer, a set top box, a wearable computer, an integrated device combining various features, such as features of the forgoing devices, or the like.

As shown in this example, a client device 600 may include one or more central processing units (CPUs) 622, which may be coupled via connection 624 to a power supply 626 and a memory 630. The memory 630 may include random access memory (RAM) 632 and read only memory (ROM) 634. The ROM 634 may include a basic input/output system (BIOS) 640.

The RAM 632 may include an operating system 641. More particularly, a client device may include or may execute a variety of operating systems, including a personal computer operating system, such as a Windows, iOS or Linux, or a mobile operating system, such as iOS, Android, or Windows Mobile, or the like. The client device 600 may also include or may execute a variety of possible applications 642 (shown in RAM 632), such as a client software application such as messenger 643, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 600 may also include or execute an application to communicate content, such as, for example, textual content, multimedia content, or the like, which may be stored in data storage 644. A client device may also include or execute an application such as a browser 645 to perform a variety of possible tasks, such as browsing, searching, playing various forms of content, including locally stored or streamed video, or games (such as fantasy sports leagues).

The client device 600 may send or receive signals via one or more interface(s). As shown in this example, the client device 600 may include one or more network interfaces 650. The client device 600 may include an audio interface 652. In addition, the client device 600 may include a display 654 and an illuminator 658. The client device 600 may further include an Input/Output interface 660, as well as a Haptic Interface 662 supporting tactile feedback technology.

The client device 600 may vary in terms of capabilities or features. Claimed subject matter is intended to cover a wide range of potential variations. For example, a cell phone may include a keypad such 656 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 664 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Figure 7:
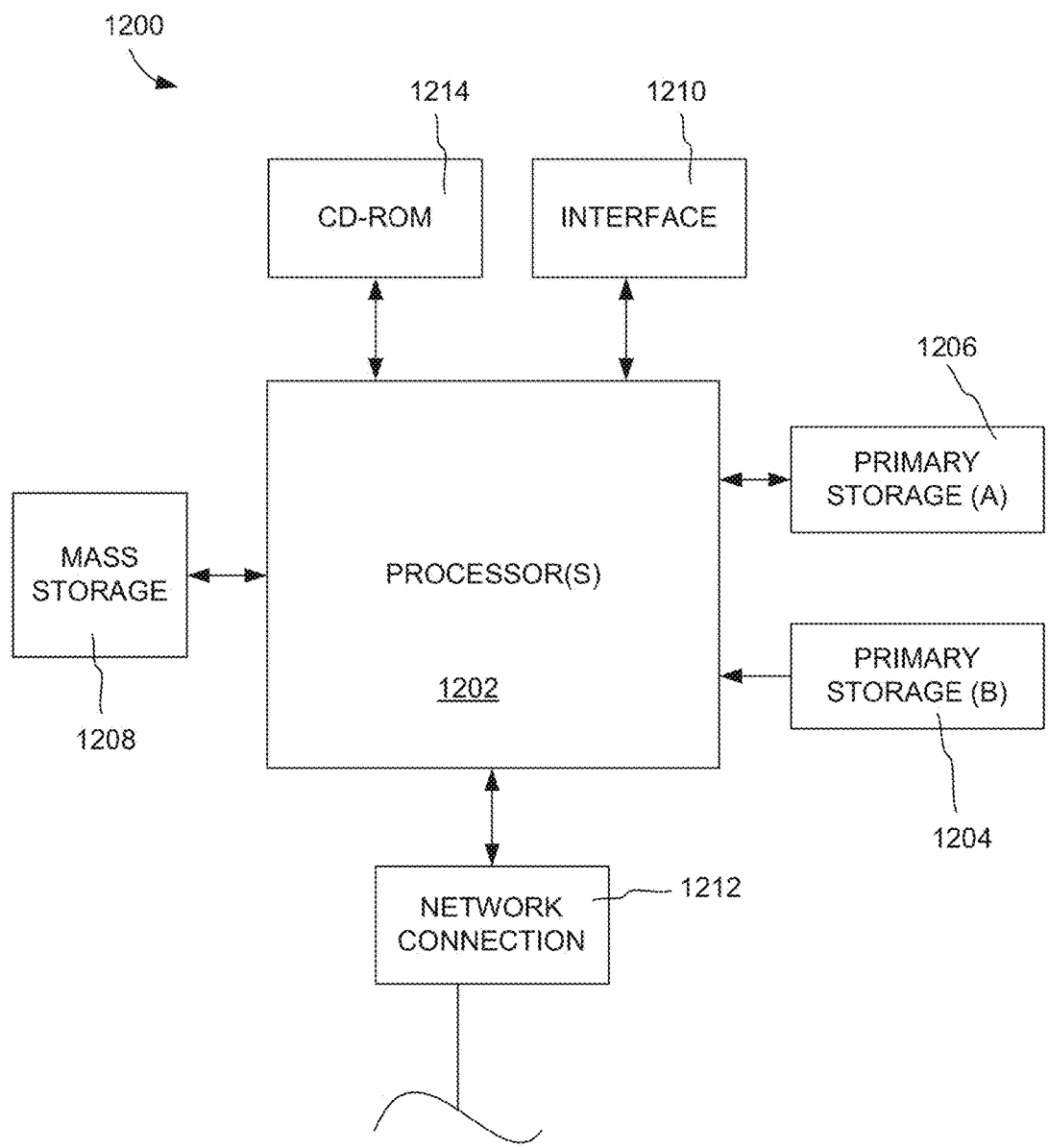
FIG. 7 is a schematic diagram illustrating an example computer system in which various embodiments may be implemented.

FIG. 7 illustrates a typical computer system that, when appropriately configured or designed, can serve as a system of this invention. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device

1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   capturing a particular media item via a device such that the particular media item is stored in a memory;
   when the particular media item is captured via the device, obtaining, by the device, a first set of one or more metadata values, the first set of one or more metadata values indicating conditions present when the particular media item is captured by the device; and
   storing, in the memory, the first set of one or more metadata values such that the first set of one or more metadata values are associated with the particular media item in a set of media items, each media item in the set of media items being stored in the memory or another memory such that a set of one or more metadata values of the corresponding one of the set of media items indicating conditions present when the media item was captured is associated with the corresponding media item;
   obtaining a second set of one or more metadata values via a mobile device in response to a user action with respect to the mobile device, the second set of one or more metadata values indicating conditions present when the user action is detected, the conditions present when the user action is detected indicating a present context, wherein the user action does not specify the second set of one or more metadata values;
   generating a query, by the mobile device, based, at least in part, upon at least a portion of the second set of one or more metadata values; and
   providing one or more of the set of media items via the mobile device according to the query;
   wherein providing one or more of the set of media items comprises rendering, via a display of the mobile device, a carousel including representations of multiple media items including the particular media item, wherein a position of each of the representations of the multiple media items in the carousel indicates a relationship between at least a portion of the set of one or more metadata values of the corresponding one of the multiple media items and at least a portion of the second set of one or more metadata values.

2. The method as recited in claim 1, wherein first the set of one or more metadata values comprises a location of the device when the particular media item is captured by the device, and wherein the second set of one or more metadata values comprises a location of the mobile device when the user action is detected.

3. The method as recited in claim 1, wherein at least one of the first set of one or more metadata values pertains to the device, a user of the device, or one or more friends of the device.

4. The method as recited in claim 1, further comprising:
   receiving a selection of a set of one or more metadata items from a plurality of metadata items, wherein obtaining a set of one or more metadata values via the mobile device includes obtaining a value for each of the set of one or more metadata items.

5. The method as recited in claim 1, wherein the user action comprises a gesture, a movement of the mobile device or a touch-based interaction with the display of the mobile device.

6. The method as recited in claim 1, wherein the device is the mobile device and the memory is a local memory of the mobile device.

7. The method as recited in claim 6, wherein the particular media item is a photograph, and wherein the first set of one or more metadata values indicate conditions present when the particular media item was captured via a camera of the mobile device.

8. The method as recited in claim 1, wherein storing the first set of one or more metadata values such that the first set of one or more metadata values are associated with the particular media item in a set of media items comprises:
   storing, by a server, the first set of one or more metadata values in one or more storage devices;
   wherein the set of media items is stored in the one or more storage devices.

9. The method as recited in claim 1, wherein the first set of one or more metadata values indicate conditions present when the particular media item was captured via a camera of the device.

10. The method as recited in claim 1, wherein the first set of one or more metadata values do not pertain to the particular media item.

11. The method as recited in claim 1, wherein the first set of one or more metadata values are detected by the device when the particular media item is captured by the device.

12. The method as recited in claim 1, wherein the particular media item comprises a photograph, audio, or video.

13. The method as recited in claim 1, wherein the device is the mobile device or a second mobile device.

14. The method as recited in claim 1, wherein the representations of the multiple media items form a semi-circular or circular pattern.

15. The method as recited in claim 14, wherein at least a portion of the representations are at least partially overlapping.

16. The method as recited in claim 1, wherein the representations of the multiple media items are presented along a single axis.

17. The method as recited in claim 1, wherein each media item in the set of media items and the corresponding set of one or more metadata values are stored such that the set of media items are indexed and sorted according to values including the set of one or more metadata values of each media item in the set of media items.

18. The method as recited in 1, wherein capturing the particular media item comprises generating the particular media item, and wherein each media item of the set of media items and the corresponding set of one or more metadata values are stored such that the corresponding set of one or more metadata values indicates conditions present when the media item was generated.

19. A method, comprising:
   detecting, by a mobile device, a user action with respect to the mobile device;
   obtaining, by the mobile device, a set of one or more metadata values, the set of one or more metadata values indicating conditions present when the user action is detected, the conditions indicating a present context, wherein the user action does not specify the set of one or more metadata values;
   identifying, by the mobile device, one or more media items in a set of media items, wherein identifying one or more media items in a set of media items includes generating a query based at least in part, on at least a portion of the set of one or more metadata values, each of the set of media items being stored in a memory and having associated therewith a second set of one or more metadata values stored in the memory and indicating conditions present when the one of the set of media items was captured, wherein identifying one or more media items in the set of media items includes identifying at least a portion of the set of media items based, at least in part, on at least a portion of the second set of one or more metadata values and the at least a portion of the set of one or more metadata values; and
   providing, by the mobile device, the one or more media items that have been identified;
   wherein providing the one or more media items comprises rendering, via a display of the mobile device, a carousel including representations of multiple media items, wherein a position of each of the of the representations of the multiple media items in the carousel indicates a relationship between the at least a portion of the second set of one or more metadata values of the corresponding one of the multiple media items and the at least a portion of the set of one or more metadata values.

20. The method as recited in claim 19, wherein the user action comprises a movement of the mobile device or a touch-based interaction with the display of the mobile device.

21. The method as recited in claim 19, wherein the set of one or more metadata values comprises a location of the mobile device and at least one of: 1) identities of friends at the location or within a vicinity of the location or 2) friends who were previously at the location or previously within a particular vicinity of the location.

22. The method as recited in claim 19, wherein identifying one or more media items in a set of media items according to the query comprises executing the query using a server.

23. A method, comprising:
   detecting, by a device, a user action;
   obtaining a first set of one or more metadata values via the device, the first set of one or more metadata values indicating first conditions present with respect to at least one of the device, the user of the device, or one or more friends of the user, the first conditions indicating a current context, wherein the user action does not specify the first set of one or more metadata values;
   identifying multiple media items in a plurality of media items stored in a memory, wherein identifying multiple media items in a plurality of media items stored in a memory includes generating a query by the device, wherein each of the plurality of media items has associated therewith a second set of one or more metadata values stored in the memory and indicating second conditions present when the one of the plurality of media items was captured by the device or another device, wherein identifying multiple media items in a plurality of media items includes identifying at least a portion of the plurality of media items based, at least in part, on at least a portion of the second set of one or more metadata values of at least a portion of the plurality of media items and at least a portion of the first set of one or more metadata values; and
   rendering, via a display of the device, a virtual carousel including representations of the multiple media items, wherein a position of each of the representations of the multiple media items in the virtual carousel indicates a relationship between the at least a portion of the second set of one or more metadata values of the corresponding one of the multiple media items and the at least a portion of the first set of one or more metadata values;
   wherein the device is a mobile device.

24. The method as recited in claim 23, further comprising:
   navigating among the multiple media items in the virtual carousel in response to the user action;
   wherein the user action includes a gesture, a movement of the device or a touch-based interaction with the display of the device.

25. The method as recited in claim 23, wherein the user action includes a gesture, a movement of the device or a touch-based interaction with the display of the device;
   wherein the obtaining, identifying, and providing steps are performed in response to detecting the user action.

26. The method as recited in claim 23, wherein identifying multiple media items in a plurality of media items further comprises:
   executing the query by the device, wherein the memory is a local memory of the device.

27. The method as recited in claim 23, wherein identifying multiple media items in a plurality of media items further comprises:
   executing the query by a server, wherein the memory includes one or more storage devices coupled to the server.

28. The method as recited in claim 23, wherein the first set of one or more metadata values are not specified by the user, and wherein obtaining the first set of metadata values includes detecting the first set of metadata values via the device.

29. The method as recited in claim 23, the second conditions being independent from content of the one of the plurality of media items.

30. The method as recited in claim 23, wherein the second set of metadata values associated with the at least a portion of the plurality of media items includes a location of a device at a time of capture of the corresponding media item at the device, and wherein the first set of metadata values includes a location of the mobile device at a time that a user action is detected.

31. The method as recited in claim 23, wherein the second set of metadata values associated with the at least a portion of the plurality of media items includes an orientation of the device at a time of the capture of the corresponding one of the plurality of media items by the device, and wherein the first set of metadata values includes an orientation of the mobile device at a time that the user action is detected.

32. An apparatus, comprising:
one or more processors; and
one or more memories, at least one of the processors or the memories being adapted for:
obtaining a first set of one or more metadata values via a mobile device, the first set of one or more metadata values indicating first conditions present with respect to at least one of the mobile device, the user of the mobile device, or one or more friends of the user, the first conditions indicating a current context;
identifying multiple media items in a plurality of media items stored in a memory, wherein identifying multiple media items in a plurality of media items includes generating a query by the mobile device, wherein each of the plurality of media items has associated therewith a second set of one or more metadata values stored in the memory and indicating second conditions present when the one of the plurality of media items was captured by the mobile device or another mobile device, wherein identifying multiple media items in a plurality of media items includes identifying at least a portion of the plurality of media items based, at least in part, on at least a portion of the second set of one or more metadata values of at least a portion of the plurality of media items and at least a portion of the first set of one or more metadata values; and
providing, via the mobile device, a virtual carousel including representations of the multiple media items, wherein providing the virtual carousel includes rendering the virtual carousel via a display of the mobile device, wherein a position of each of the representations of the multiple media items in the virtual carousel indicates a relationship between the at least a portion of the second set of one or more metadata values of the corresponding one of the multiple media items and the at least a portion of the first set of one or more metadata values.

33. The apparatus as recited in claim 32, at least one of the processors or memories being adapted for performing steps, further comprising:
navigating among the multiple media items in the virtual carousel in response to a user action;
wherein the user action includes a gesture, a movement of the mobile device or a touch-based interaction with the display of the mobile device.

34. The apparatus as recited in claim 32, at least one of the processors or memories being adapted for performing steps, further comprising:
detecting a user action, wherein the user action includes a gesture, a movement of the mobile device or a touch-based interaction with the display of the mobile device;
wherein the obtaining is performed in response to detecting the user action.

35. The apparatus as recited in claim 32, the second conditions being present with respect to at least one of mobile device, the user of the mobile device, or one or more friends of the user.

* * * * *